(12) United States Patent
Olulana et al.

(10) Patent No.: US 10,703,486 B2
(45) Date of Patent: Jul. 7, 2020

(54) SEAT FASTENING DEVICE

(71) Applicant: Airbus Defence and Space GmbH, Taufkirchen (DE)

(72) Inventors: Paul Olulana, Hamburg (DE); Patrick Rollfink, Hamburg (DE)

(73) Assignee: AIRBUS DEFENCE AND SPACE GMBH, Taufrikchen (DE)

( * ) Notice: Subject to any disclaimer, the term of this patent is extended or adjusted under 35 U.S.C. 154(b) by 582 days.

(21) Appl. No.: 15/457,024

(22) Filed: Mar. 13, 2017

(65) Prior Publication Data
US 2017/0259925 A1 Sep. 14, 2017

(30) Foreign Application Priority Data

Mar. 14, 2016 (EP) .................................... 16160231

(51) Int. Cl.
*B64D 11/06* (2006.01)
*B60N 2/015* (2006.01)
*B64C 1/20* (2006.01)

(52) U.S. Cl.
CPC .......... *B64D 11/0696* (2013.01); *B60N 2/015* (2013.01); *B64C 1/20* (2013.01)

(58) Field of Classification Search
CPC ........ B64D 11/0696; B60N 2/015; B64C 1/20
See application file for complete search history.

(56) References Cited

U.S. PATENT DOCUMENTS

| 4,157,797 A | 6/1979 | Fox | |
| 4,582,369 A * | 4/1986 | Itoh | F16C 29/0607 384/13 |
| 4,637,739 A * | 1/1987 | Hattori | F16C 29/0657 384/45 |
| 4,927,201 A * | 5/1990 | Froutzis | B60N 2/01508 248/503.1 |
| 5,102,235 A * | 4/1992 | Mugglestone | F16C 29/0609 384/43 |

(Continued)

FOREIGN PATENT DOCUMENTS

| CA | 2704897 | 3/2011 |
| CA | 2823551 | 2/2014 |

(Continued)

OTHER PUBLICATIONS

European Search Report, dated Aug. 2, 2016, priority document.

*Primary Examiner* — Anita M King
(74) *Attorney, Agent, or Firm* — Greer, Burns & Crain, Ltd.

(57) ABSTRACT

In order to enhance sliding movement and reconfiguration of vehicle seats while using a simple construction, a seat fastening device is provided for fastening vehicle seats in a vehicle. The seat fastening device comprises a seat rail with a T-shaped profile portion and a carriage enclosing an upper part of the T-shaped profile portion. The carriage includes a seat fixation device for fixing a vehicle seat, wherein the carriage includes a clamp arrangement for clamping the carriage onto the T-shaped profile portion. The carriage has a base body and first and second bracket clamps so that the carriage has a C-shaped channel section receiving the T-shaped profile portion. The height of the C-shaped channel section can be adjusted by at least one screw in order to clamp the carriage onto the T-shaped profile portion.

12 Claims, 2 Drawing Sheets

(56) References Cited

U.S. PATENT DOCUMENTS

| | | | | |
|---|---|---|---|---|
| 5,449,132 | A * | 9/1995 | Gilbert | B64D 11/0696 |
| | | | | 244/122 R |
| 7,168,674 | B2 * | 1/2007 | McFarlane | B64D 11/0696 |
| | | | | 248/424 |
| 8,231,097 | B2 * | 7/2012 | Pinkal | B64D 11/0696 |
| | | | | 244/118.1 |
| 8,944,378 | B2 * | 2/2015 | Bishop | B64D 11/0696 |
| | | | | 244/118.1 |
| 9,789,965 | B2 * | 10/2017 | Benthien | B60N 2/072 |
| 9,902,498 | B2 * | 2/2018 | Gensch | B60N 2/01575 |
| 2011/0062286 | A1 | 3/2011 | Pinkal | |
| 2011/0309195 | A1 | 12/2011 | Bishop et al. | |
| 2012/0145867 | A1 | 6/2012 | Benthien et al. | |
| 2014/0042273 | A1 | 2/2014 | Day et al. | |
| 2014/0077577 | A1 | 3/2014 | Gensch et al. | |

FOREIGN PATENT DOCUMENTS

| | | |
|---|---|---|
| DE | 102009028533 | 2/2011 |
| DE | 102009028534 | 2/2011 |
| DE | 102009028903 | 3/2011 |
| EP | 2397409 | 12/2011 |
| FR | 2972971 | 9/2012 |
| WO | 2012152937 | 11/2012 |

* cited by examiner

SEAT FASTENING DEVICE

CROSS-REFERENCES TO RELATED APPLICATIONS

This application claims the benefit of the European patent application No. 16160231.3 filed on Mar. 14, 2016, the entire disclosures of which are incorporated herein by way of reference.

BACKGROUND OF THE INVENTION

The invention relates to a seat fastening device for fastening vehicle seats in a vehicle, especially in an aircraft, wherein the seat fastening device comprises a seat rail with T-shaped profile portion and a carriage enclosing an upper part of the T-shaped profile portion.

A seat fastening device using a T-shaped seat rail is known from DE 10 2009 028 534 A1, DE 10 2009 028 533 A1, DE 10 2009 028 903 A1 and WO 2012/152937 A2.

Further seat fastening devices to be used for fastening seats of an aircraft seating arrangement are known from U.S. Pat. No. 4,157,797 A, CA 2 823 551 A, CA 2 704 897 A, EP 2 397 409 A, FR 2 972 971 A and US 2012/0145867 A1.

The currently known seat tracks and seat fittings in an aircraft cabin are quite efficient for fixation of seats, but are complex in design and do not provide the possibility of an easily moving the seats from one position to another in a short period.

SUMMARY OF THE INVENTION

A problem to be solved by the invention is to provide a simple seat fastening device that is flexible in use and allows a fast reconfiguration of a seat arrangement within a vehicle.

According to a first aspect, the invention provides a seat fastening device for fastening vehicle seats in a vehicle, especially an aircraft, the seat fastening device comprising a seat rail with a T-shaped profile portion and a carriage enclosing an upper part of the T-shaped profile portion, the carriage including a seat fixation means for fixing a vehicle seat, wherein the carriage includes a clamp means for clamping the carriage onto the T-shaped profile portion wherein the carriage has a base body and first and second bracket clamps so that the carriage has a C-shaped channel section receiving the T-shaped profile portion and in that the height of the C-shaped channel section can be adjusted by at least one screw means in order to clamp the carriage onto the T-shaped profile portion.

It is preferred that at least one linear roller contact bearing is arranged between the T-shaped profile portion and the carriage.

It is preferred that the roller contact bearing includes at least one ball race formed on at least one lower surface of the carriage.

It is preferred that the ball race includes a groove extending in a longitudinal direction with regard to the seat track.

It is preferred that the roller contact bearing and/or the roller elements of the roller contact bearing are resiliently supported so that the roller elements can be resiliently retracted into at least on recess when the carriage is clamped onto the T-shaped profile portion.

It is preferred that the screw means includes a first and second screw pin for changing positions of the first and second bracket clamps relative to the base body and in that the base body includes a first and second vertical through opening extending in a vertical direction through the base body for receiving the first and second screw pins, respectively.

It is preferred that the seat fixation means includes a projection with a horizontal through bore.

It is preferred that the first and second through openings are arranged on the left and right side of the projection.

According to another aspect, the invention provides a vehicle seat arrangement, comprising at least one vehicle seat and a seat fastening device according to any of the above-mentioned embodiments for fastening the seat in a vehicle.

According to another aspect, the invention provides a vehicle cabin, especially aircraft cabin, comprising a plurality of seat fastening devices according to any of the above-mentioned embodiments.

According to another aspect, the invention provides a method for locking an aircraft seat in seat tracks provided in an aircraft cabin, characterized by using seat fastening devices according to any of the above-mentioned embodiments, and comprising the steps of:

sliding the carriages with the seat fixation fixed to feet of the seat to a predetermined position and clamping the carriages with the clamping means.

A preferred embodiment of the invention relates to an adaptive friction clamp set fastener apparatus for positioning, sliding and fastening of aircraft seats.

An advantageous embodiment of the invention is developed as a solution to the technical problem of a lack of seating configuration flexibility in an aircraft cabin.

Advantageous embodiments of the invention provide better flexibility and a faster reconfiguration of aircraft seat arrangements.

A preferred embodiment provides the advantages of
More seating configuration flexibility
Rapid configuration
Easier fixation to an aircraft frame
A light-weight solution for flexible seat fittings.

A preferred embodiment of a seat fastener device provides the possibility to re-position and fasten aircraft seats within a short period of time by making use of a friction-based clamp system via bolts.

In a preferred embodiment, a seat rail is an adaptive seat rail designed to fit into standard aircraft seat tracks provided in an aircraft cabin. The seat rail is designed at one end to fit into these standard aircraft seat tracks. On its other end, the seat rail provides a trajectory for a fitting which is able to slide in a longitudinal direction of the seat rail. The fitting especially includes a carriage which is configured to encompass or to enclose a T-shaped profile portion of the seat rail.

A fastened mode of a seat is accomplished by the fitting being bolted together with a clamp by means of the bolt and a pin. The pin has a circular head which holds the clamp firmly in position with the adaptive seat rail.

A sliding mode for the seat is made possible when a first and a second bolt and a first and a second pin are loosened and the clamp is detached from the adaptive seat rail. The fitting includes a first canal and a second canal housing roller contact bearings, especially ball bearings. These roller contact bearings enable the whole fitting system and the attached seat to be able to slide smoothly on the top surface of the rail, to the required new position at which the seat is re-positioned and fastened again by tightening the bolts and the pins in order to clamp the fitting onto the seat rail.

BRIEF DESCRIPTION OF THE DRAWINGS

Further details of the invention become more clear from the following description of a preferred embodiment of the invention with reference to the accompanying drawings, wherein.

DETAILED DESCRIPTION OF THE PREFERRED EMBODIMENTS

Figure 1:
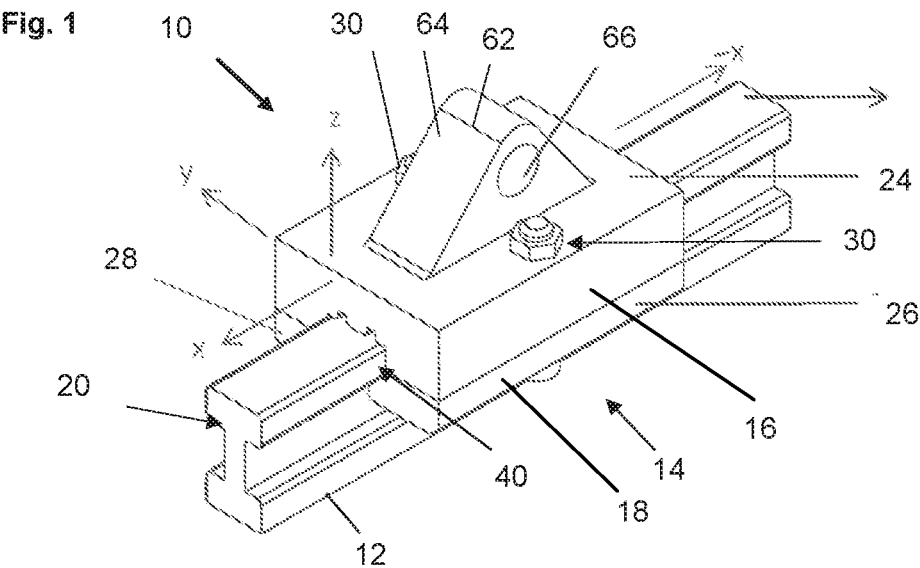
FIG. 1 shows a perspective view of a preferred embodiment of a seat fastening device.
Figure 2:
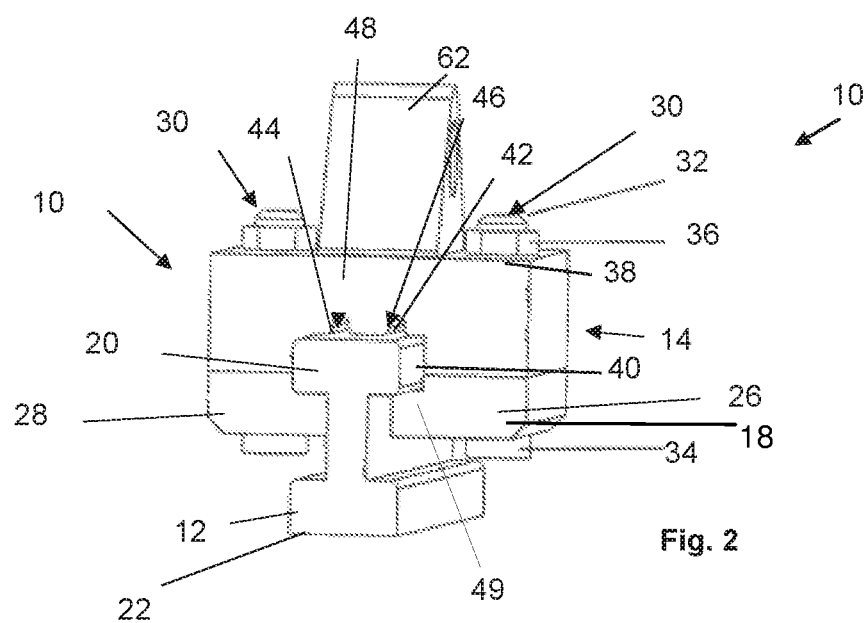
FIG. 2 shows a further perspective view of the preferred embodiment of the seat fastening device.

A seat fastening device 10 is shown in the perspective views of FIGS. 1 and 2. The seat fastening device 10 includes a seat rail 12 and a fitting 14 in form of a carriage 16. The carriage 16 can be clamped onto the seat rail 12 by a clamping means 18.

The seat rail 12 has an upper part provided as a first T-shaped profile portion 20 and a lower part 22 designed to fit into standard aircraft seat tracks (not shown) arranged at the floor of a vehicle cabin 23, which may be an aircraft cabin. The lower part 22 may be formed as a second T-shaped profile portion.

The carriage 16 has a base body 24 and a first and second bracket clamp 26, 28 wherein the relative position between the bracket clamps 26, 28 and the base body 24 can be adjusted via screw means 30.

The screw means 30 and the bracket clamps 26, 28 are parts of the clamping means 18.

The screw means 30 may include a threaded pin 32 or a screw pin 32 with a screw head 34 and a screw nut 36.

The base body 24 has a first and a second through opening 38 or through bore for receiving the first and second screw pin 32.

By tightening the screw means 30, the first and second bracket clamps 26, 28 are positioned closer to the base body 24.

As visible from FIGS. 1 and 2, the base body 24 has essentially the form of a cuboid wherein a lower surface thereof is provided with a channel-shaped recess 40 wherein at the base of the channel-shaped recess 40 a first and a second channel are arranged for receiving a first and a second rolling contact bearing 46, 48.

The bracket clamps 26, 28 have a profile-shape in the form of an angle bracket, so that the fitting 14 including the base body 24 and the first and second bracket clamp 26, 28 provides a C-shaped profile for encompassing the T-shaped profile portion 20 of the seat rail 12 in a positive engaging manner.

Hence, the T-shaped profile portion is enclosed in a C-shaped channel section 49 defined by the channel-shaped recess 40 and the inner surfaces of the bracket clamps 26, 28. The height of the C-shaped channel section is adjustable via the screw means 30 in order to clamp the carriage 16 onto the first T-shaped profile portion 20.

Figure 3:
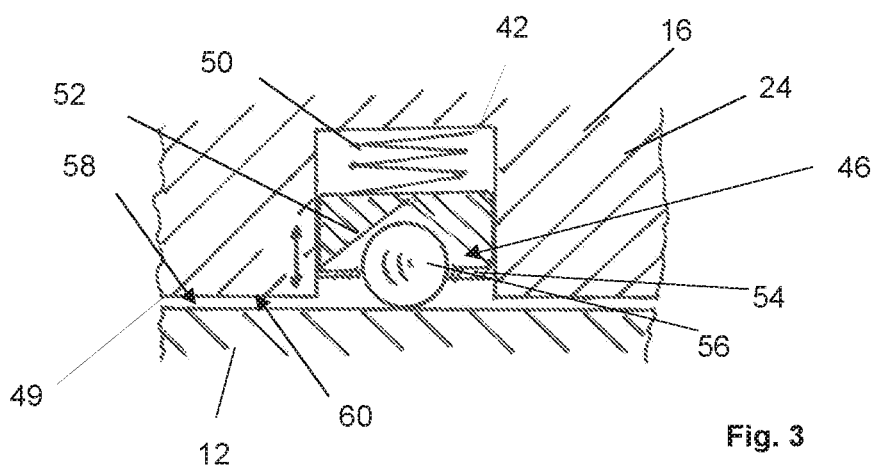
FIG. 3 shows a schematic view of an embodiment of a rolling contact bearing resiliently supported within a groove or channel in a base body of the seat fastening device.
Figure 4:
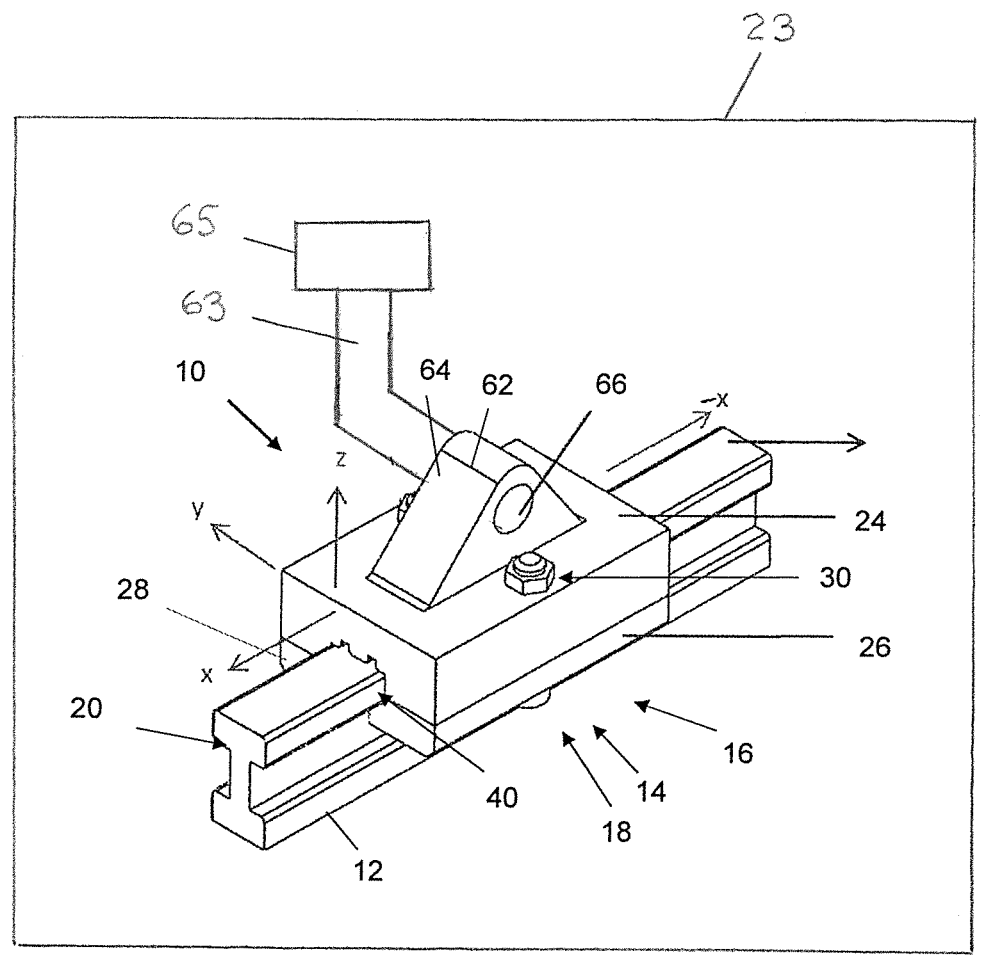
FIG. 4 shows a schematic perspective view of the embodiment of FIG. 1 located within a vehicle cabin, and including a vehicle seat.

FIG. 3 shows a schematic view of one of the rolling contact bearings 46, 48. The rolling contact bearings 46, 48 are similar in form and function so that only one of them is shown in FIG. 3.

The rolling contact bearing 46, 48 is resiliently supported within the channel 42, 44 via a resilient support element 50. The rolling contact bearing 46 comprises a ball race 52, a ball cage 54, and balls 56.

The resilient support element 50 may comprise a body of elastomer material or any other resilient element such as a spring element or the like. The resilient support element 50 is configured such that in a sliding mode, where the screw means are loosened so that the bracket clamps 26, 28 are free from the first T-shaped profile portion, the balls 56 of the rolling contact bearing 46 are pressed on the upper surface 58 of the seat rail 12 so that the base body 24 of the carriage 16 and the seat connected therewith are lifted and so that the carriage 16 glides on the balls 56 of the rolling contact bearing, and an easy sliding of the carriage 16 along the seat rail 12 is possible. Further, the resilient support elements 50 provide the function that in a clamping mode or fastened mode, where the screw means 30 are tightened, the balls 56 are retracted into the channel 42 so that a press surface 60 between the first and second rolling contact bearings 46, 48 is pressed against the upper surface 58 of the seat rail in order to tightly clamping the fitting 14 onto the seat rail.

The carriage 16 further includes a seat fixation means 62 where a foot 63 of an aircraft seat, shown schematically at 65, can be connected. The seat fixation means 62 includes a projection 64 with a horizontal through bore 66.

As visible from FIG. 1, the first and second through openings 38 are provided in the center of the carriage 16 on both sides of the projection 64.

In use of the seat fastening device 10, the fitting 14 is bolted together with the first and second bracket clamps 26, 28 via the screw means 30 so that an adaptive friction clamp locks the carriage 16 in any wished position along the seat rail 12. For a reconfiguration, the screw means 30 is loosened; the resilient support elements 50 push the balls 56 out of the channels 42, 44 so that the rolling contact bearings 46, 48 provide an easy and smooth sliding movement on the top surface 58 of the seat rail 12. Hence, the whole seat which feet are connected via the seat fastening devices 10 can ride along the seat rails 12 to a new desired position. There, the screw means 30 are tightened again to lock the seat in the new desired position.

The preferred embodiment of the seat fastening device 10 has been developed by a function breakdown of aircraft seats and fixation of the same to the aircraft frame and by identifying sub-functions. Further, function elements for each function and sub-function of the seat fastening device have been developed. The design of the developed function elements has been integrated to construct the embodiment as shown in the figures.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 seat fastening device
12 seat rail
14 fitting
16 carriage
18 clamping means
20 T-shaped profile portion
22 lower part; 23 vehicle cabin
24 base body
26 first bracket clamp
28 second bracket clamp
30 screw means
32 pin
34 screw head
36 screw nut
38 through opening
40 channel-shaped recess
42 first channel
44 second channel
46 first rolling contact bearing
48 second rolling contact bearing
49 C-shaped channel section
50 resilient support element
52 ball race
54 ball cage
56 ball
58 upper surface
60 press surface
62 seat fixation means; 63 foot
64 projection; 65 aircraft seat
66 through bore

The invention claimed is:

1. A seat fastening device for fastening vehicle seats in a vehicle, comprising:
a seat rail with a T-shaped profile portion and
a carriage enclosing an upper part of the T-shaped profile portion,
the carriage including a seat fixation means for fixing a vehicle seat,
the carriage including a clamp means for clamping the carriage onto the T-shaped profile portion,
the carriage having a base body and first and second bracket clamps movable towards and away from the base body so that the carriage has a C-shaped channel section receiving the T-shaped profile portion and wherein a height of the C-shaped channel section can be adjusted by at least one screw means in order to clamp the carriage onto the T-shaped profile portion.

2. A seat fastening device for fastening vehicle seats in a vehicle, comprising:
a seat rail with a T-shaped profile portion and
a carriage enclosing an upper part of the T-shaped profile portion,
the carriage including a seat fixation means for fixing a vehicle seat,
the carriage including a clamp means for clamping the carriage onto the T-shaped profile portion,
the carriage having a base body and first and second bracket clamps so that the carriage has a C-shaped channel section receiving the T-shaped profile portion and wherein a height of the C-shaped channel section can be adjusted by at least one screw means in order to clamp the carriage onto the T-shaped profile portion and
at least one linear roller contact bearing between the T-shaped profile portion and the carriage.

3. The seat fastening device according to claim 2, wherein the roller contact bearing includes a ball race formed on a lower surface of the carriage.

4. The seat fastening device according to claim 3, wherein the ball race is provided in a groove or channel extending in a longitudinal direction with regard to the seat rail.

5. The seat fastening device according to claim 2, wherein roller elements of the roller contact bearing are resiliently supported so that the roller elements can be resiliently retracted into at least one recess when the carriage is clamped onto the T-shaped profile portion.

6. A seat fastening device for fastening vehicle seats in a vehicle, comprising:
a seat rail with a T-shaped profile portion and
a carriage enclosing an upper part of the T-shaped profile portion,
the carriage including a seat fixation means for fixing a vehicle seat,
the carriage including a clamp means for clamping the carriage onto the T-shaped profile portion,
the carriage having a base body and first and second bracket clamps so that the carriage has a C-shaped channel section receiving the T-shaped profile portion and wherein a height of the C-shaped channel section can be adjusted by at least one screw means in order to clamp the carriage onto the T-shaped profile portion
wherein the screw means includes first and second screw pins for changing positions of the first and second bracket clamps relative to the base body and wherein the base body includes a-first and second vertical through openings extending in a vertical direction through the base body for receiving the first and second screw pins, respectively.

7. The seat fastening device according to claim 1, wherein the seat fixation means includes a projection with a horizontal through bore.

8. The seat fastening device according to claim 6, wherein the seat fixation means includes a projection with a horizontal through bore, and
wherein the first and second through openings are arranged on the left and right side of the projection.

9. A vehicle seat arrangement comprising at least one vehicle seat and a seat fastening device according to claim 1 for fastening the seat in a vehicle.

10. A vehicle cabin comprising a plurality of seat fastening devices according to claim 1.

11. The vehicle cabin according to claim 10 comprising an aircraft cabin.

12. A method for locking an aircraft seat in seat tracks provided in an aircraft cabin, utilizing seat fastening devices according to claim 1, and comprising the steps:
sliding the carriages with the seat fixation means fixed to feet of the seat to a predetermined position, and
clamping the carriages with the clamp means.

* * * * *